(12) United States Patent
Kawano et al.

(10) Patent No.: US 9,413,964 B2
(45) Date of Patent: Aug. 9, 2016

(54) IMAGING APPARATUS, METHOD FOR DRIVING IMAGING APPARATUS, IMAGING SYSTEM, AND DRIVING METHOD FOR IMAGING SYSTEM

(71) Applicant: CANON KABUSHIKI KAISHA, Tokyo (JP)

(72) Inventors: Fujio Kawano, Kawasaki (JP); Kazuyuki Shigeta, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 14/195,194

(22) Filed: Mar. 3, 2014

(65) Prior Publication Data

US 2014/0253752 A1   Sep. 11, 2014

(30) Foreign Application Priority Data

Mar. 7, 2013 (JP) ................. 2013-045705
Dec. 6, 2013 (JP) ................. 2013-253479

(51) Int. Cl.
 *H04N 5/235* (2006.01)
 *H04N 5/232* (2006.01)
 *H04N 5/345* (2011.01)
 *H04N 5/355* (2011.01)
 *H04N 5/376* (2011.01)

(52) U.S. Cl.
 CPC ......... *H04N 5/23274* (2013.01); *H04N 5/2351* (2013.01); *H04N 5/3454* (2013.01); *H04N 5/35563* (2013.01); *H04N 5/35572* (2013.01); *H04N 5/35581* (2013.01); *H04N 5/376* (2013.01)

(58) Field of Classification Search
 CPC ........................................ H04N 5/235
 USPC .................................. 348/274, 294
 See application file for complete search history.

(56) References Cited

U.S. PATENT DOCUMENTS

| | | | | |
|---|---|---|---|---|
| 5,455,621 A * | 10/1995 | Morimura | ........... | H04N 5/235 348/221.1 |
| 7,768,561 B2 | 8/2010 | Suzuki | | |
| 7,859,575 B2 | 12/2010 | Ota et al. | | |
| 8,189,086 B2 | 5/2012 | Hashimoto et al. | | |
| 8,310,576 B2 | 11/2012 | Hashimoto et al. | | |
| 8,390,710 B2 | 3/2013 | Shigeta et al. | | |
| 2008/0158397 A1 * | 7/2008 | Hayakawa | ........ | H04N 5/37213 348/274 |

(Continued)

FOREIGN PATENT DOCUMENTS

| | | |
|---|---|---|
| JP | 2007-074032 | 3/2007 |
| JP | 2010-130492 | 6/2010 |

*Primary Examiner* — Joel Fosselman
(74) *Attorney, Agent, or Firm* — Fitzpatrick, Cella, Harper & Scinto

(57) ABSTRACT

An imaging apparatus includes: pixels (1); signal lines each arranged correspondingly to each of columns of the plurality of pixels; a row scanning circuit (2) selecting the plurality of pixels row by row for outputting signals to the plurality of signal lines; and a first gain correcting circuit (6) correcting the signals in the plurality of signal lines by applying a gain to the signals so as to reduce a difference of a signal value due to the difference of the charge accumulation period between a first row and a second row, when a pixel region selected for reading out in a present frame is different from a pixel region selected for reading out in a previous frame so that a charge accumulation period of the first row of the plurality of pixels is different from a charge accumulation period of the second row of the plurality of pixels.

11 Claims, 16 Drawing Sheets

(56) References Cited

U.S. PATENT DOCUMENTS

| | | |
|---|---|---|
| 2010/0157083 A1 | 6/2010 | Ohya et al. |
| 2012/0019698 A1* | 1/2012 | Ui .................... H01L 27/14641 348/308 |
| 2013/0162874 A1 | 6/2013 | Hashimoto et al. |
| 2013/0228673 A1 | 9/2013 | Hashimoto et al. |
| 2013/0271633 A1 | 10/2013 | Hashimoto et al. |

* cited by examiner

CASE 1

CASE 2

CASE 3

IMAGING APPARATUS, METHOD FOR DRIVING IMAGING APPARATUS, IMAGING SYSTEM, AND DRIVING METHOD FOR IMAGING SYSTEM

BACKGROUND OF THE INVENTION

1. Field of the Invention

The present invention relates to an imaging apparatus which is used in an electronic camera and the like, and to a driving method for the same.

2. Description of the Related Art

An electronic zooming function of reading out an arbitrary region out of an imaged region is known. When the magnification in electronic zooming is changed among continuing frames or an arbitrary read out region is changed with each time period, it is considered that a difference of an accumulation period occurs among the frames. Thus, in Japanese Patent Application Laid-Open No. 2007-074032, a resetting of the accumulation period is started after an operation of reading out the previous frame has been completed, as for the frames between which the difference of the accumulation period has occurred, and thereby the accumulation period is kept constant.

SUMMARY OF THE INVENTION

According to an aspect of the present invention, an imaging apparatus comprises: a plurality of pixels arranged in a matrix, each pixel accumulating an electric charge based on an incident light quantity; a plurality of signal lines each arranged correspondingly to each of columns of the plurality of pixels; a row scanning circuit configured to select the plurality of pixels row by row for outputting signals from the plurality of pixels to the plurality of signal lines; and a first gain correcting circuit configured to correct the signals in the plurality of signal lines by applying a gain to the signals, wherein, when a pixel region selected for reading out in a present frame is different from a pixel region selected for reading out in a previous frame so that a charge accumulation period of a first row of the plurality of pixels is different from a charge accumulation period of a second row of the plurality of pixels, the first gain correcting circuit corrects the signals to reduce a difference of a signal value due to the difference of the charge accumulation period between the first row and the second row.

According to a further aspect of the present invention, a driving method of an imaging apparatus is provided, wherein the imaging apparatus comprises: a plurality of pixels arranged in a matrix, each pixel generating and accumulating an electric charge based on an incident light quantity; a plurality of signal lines each arranged correspondingly to each of columns of the plurality of pixels; and a row scanning circuit configured to select the plurality of pixels row by row for outputting signals from the plurality of pixels to the plurality of signal lines, wherein the method comprises: a first gain correcting step for correcting the signals in the plurality of signal lines by applying a gain to the signals, and wherein, when a pixel region selected for reading out in a present frame is different from a pixel region selected for reading out in a previous frame so that a charge accumulation period of a first row of the plurality of pixels is different from a charge accumulation period of a second row of the plurality of pixels, the first gain correcting step is performed to correct the signals to reduce a difference of a signal value due to the difference of the charge accumulation period between the first row and the second row.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In a method disclosed in Japanese Patent Application Laid-Open No. 2007-074032, the resetting for the accumulation period is started after the operation of reading out the previous frame has been completed, and accordingly a time period for one frame results in being long. Therefore, when a read out region is continuously changed, a frame rate consequently results in decreasing.

Each embodiment will be described below with reference to the drawings.

(First Embodiment)

Figure 1:
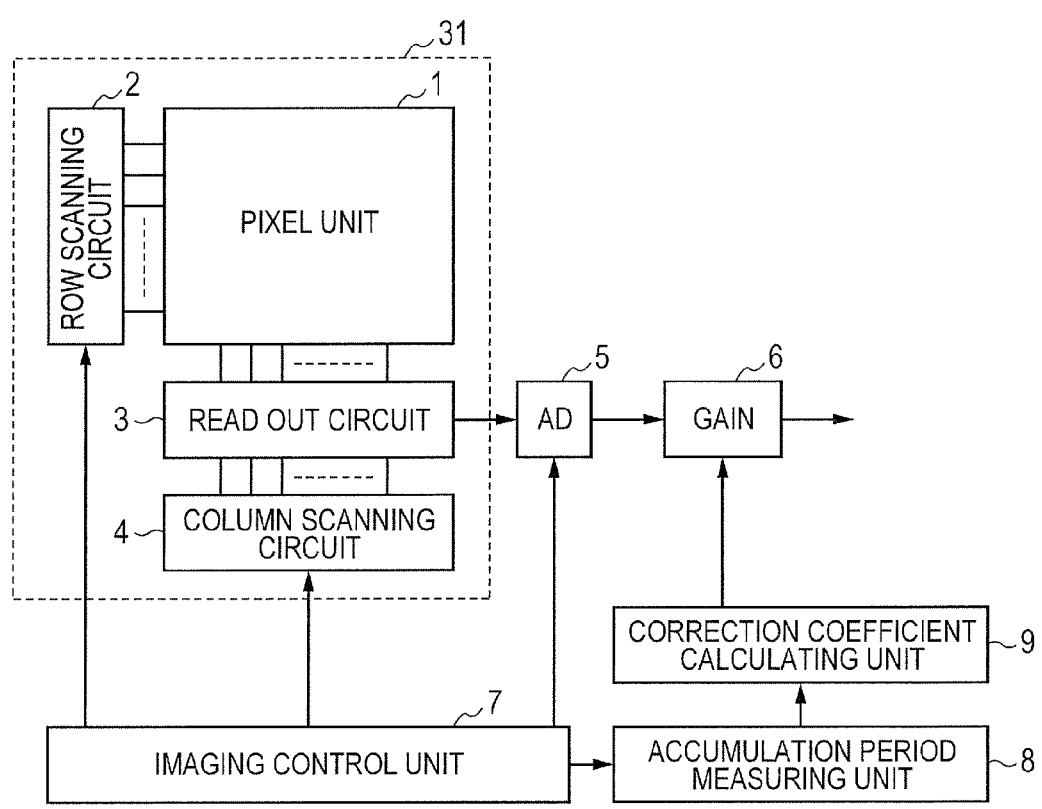
FIG. 1 is a view illustrating one example of a configuration of an imaging apparatus according to an embodiment of the present invention.

FIG. 1 is a block diagram illustrating a configuration example of a solid imaging apparatus according to a first embodiment of the present invention. A pixel unit 1 has a plurality of pixels arranged in a two-dimensional matrix, which generate and accumulate an electric charge (electric signal) based on an incident light quantity. A row scanning circuit 2 is a scanning circuit for selecting a row of the pixels in the pixel unit 1. The electric signal which has been accumulated in the pixel that constitutes the row selected by the row scanning circuit 2 is read out row by row. After this, a series of such operations that the row scanning circuit 2 sequentially scans a row in a predetermined region in the pixel unit 1 and a read out circuit 3 reads out the electric signal which has been accumulated in the pixel are referred to as read out scanning. In addition, the electric signal which has been read out by the read out circuit 3 is referred to as a pixel signal. In addition, such an operation that the row scanning circuit 2 sequentially scans the row in a predetermined region in the pixel unit 1 and resets the electric signal which has been accumulated in the pixel to a predetermined potential is referred to as reset scanning. The time period during which the electric signal is accumulated in the pixel is controlled by a time period between this reset scanning and the read out scanning. A column scanning circuit 4 is a scanning circuit for selecting the column of the pixels in the pixel unit 1. Pixel signals which have been read out row by row by the read out circuit 3 are sequentially output, column by column which has been selected by the column scanning circuit 4. An analog-to-digital converter (A/D converter) 5 converts an analog pixel signal which has been output from the read out circuit 3 to a digital pixel signal. A gain correcting circuit 6 multiplies the digital pixel signal by a predetermined value (corrects the digital pixel signal by applying a gain to the digital pixel signal), and adjusts the digital pixel signal so that a desired output level is obtained.

An imaging control unit 7 controls a row scanning signal which drives the row scanning circuit 2, a column scanning signal which drives the column scanning circuit 4, a control signal for the A/D converter 5, and the gain correcting circuit 6. The imaging control unit 7 also controls a measurement time period of an accumulation period measuring unit 8. Specifically, when a driving condition has changed between frames, the imaging control unit 7 measures the accumulation period per each of rows. A correction coefficient calculating unit 9 calculates a correction coefficient based on the measurement result of the accumulation period measuring unit 8. Specifically, the correction coefficient calculating unit 9 calculates a correction coefficient based on the measurement result of the accumulation period in each row with reference to a desired accumulation period. The correction coefficient calculating unit 9 outputs the correction coefficient to the gain correcting circuit 6. The gain correcting circuit 6 adjusts the output level of the A/D converter 5 according to the correction coefficient.

Figure 16:
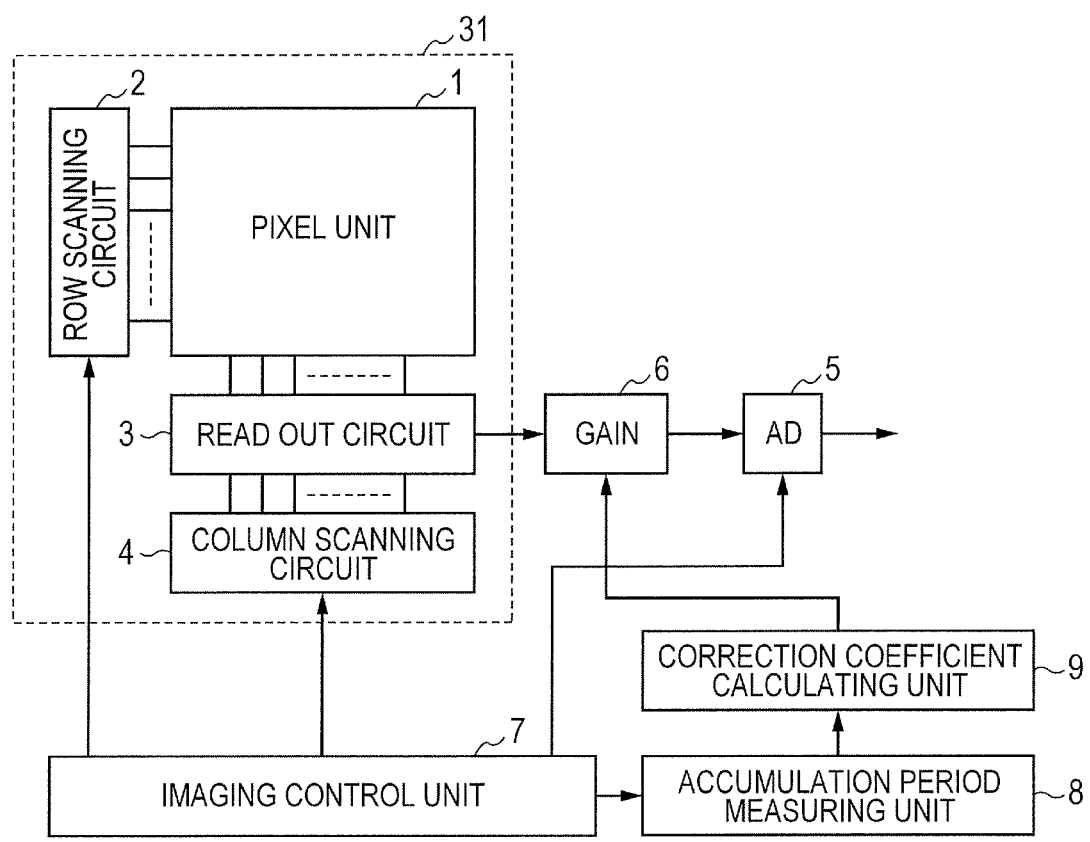
FIG. 16 is a view illustrating another example of the configuration of the imaging apparatus according to the embodiment of the present invention.
Figure 17:
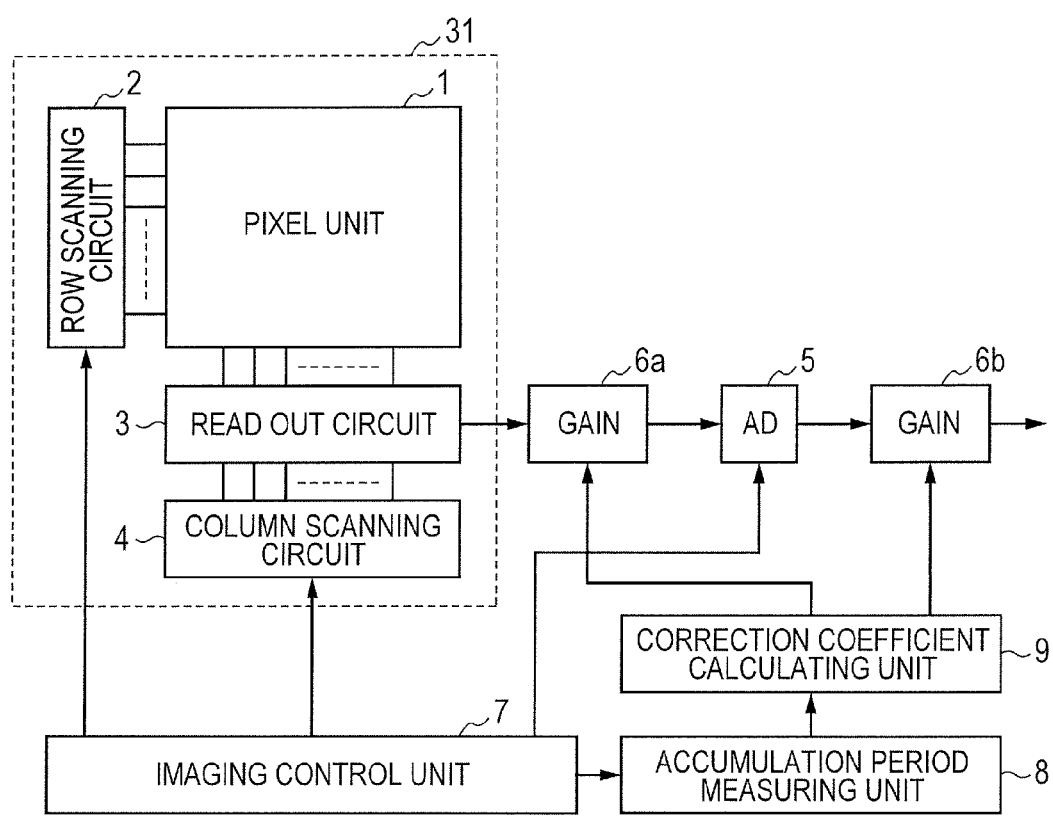
FIG. 17 is a view illustrating another example of the configuration of the imaging apparatus according to the embodiment of the present invention.

As described above, the A/D converter 5 converts the output analog signal of the read out circuit 3 to the digital signal, and the gain correcting circuit 6 corrects the digital pixel signal by applying a digital gain to the digital pixel signal. Here, as is illustrated in FIG. 16, it is acceptable that the gain correcting circuit 6 corrects the output signal of the read out circuit 3 by applying an analog gain to the output signal and the A/D converter 5 converts the output analog signal of the gain correcting circuit 6 to the digital signal. Furthermore, as is illustrated in FIG. 17, gain correcting circuits 6a and 6b may be arranged before and after the A/D converter 5, respectively. The correction coefficient calculating unit 9 outputs correction coefficients to the gain correcting circuits 6a and 6b, respectively. The first gain correcting circuit 6a corrects the output analog signal of the read out circuit 3 by applying an analog gain to the output analog signal according to the correction coefficient. The A/D converter 5 converts the output analog signal of the first gain correcting circuit 6a to the digital signal. The second gain correcting circuit 6b corrects the output digital signal of the A/D converter 5 by applying a digital gain to the output digital signal according to the correction coefficient. As described above, the imaging apparatus can correct the signals with excellent quality and high accuracy, by separately using an advantage of being capable of suppressing the loss of the resolution of the A/D converter 5 due to the correction by applying an analog gain to the analog signal in the front stage, and an advantage of being capable of coping with a detailed correction by applying a digital gain to the digital signal in the latter stage.

Figure 2:
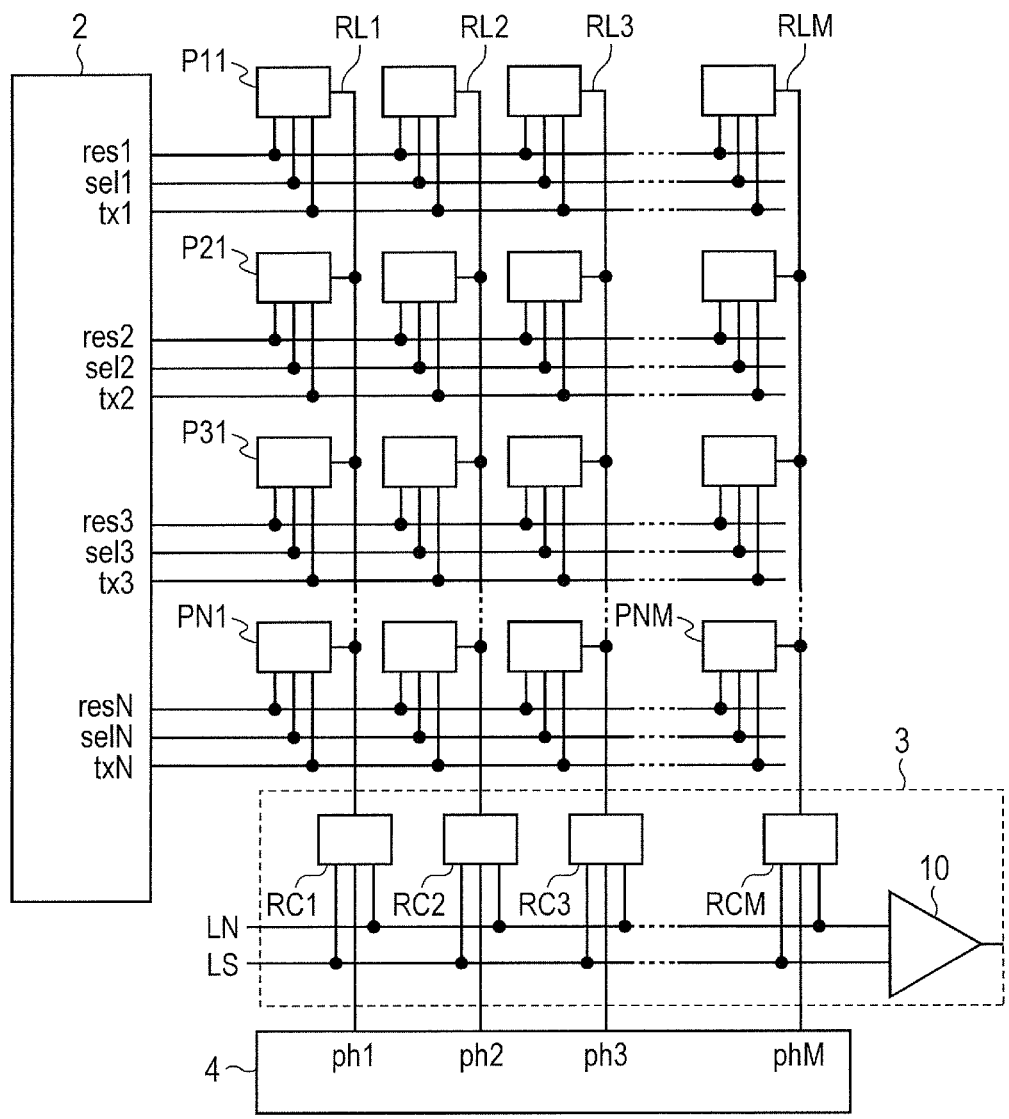
FIG. 2 is a view illustrating one example of a configuration of a pixel unit and a peripheral circuit according to the embodiment of the present invention.

FIG. 2 is a view illustrating a detailed configuration example of a block 31 in FIG. 1. The block 31 has the pixel unit 1, the row scanning circuit 2, the column scanning circuit 4 and the read out circuit 3. The pixel unit 1 has a plurality of pixels P11 to PNM arranged in a matrix, in the row direction and the column direction. The read out circuit 3 has a plurality of column read out circuits RC1 to RCM and an output amplifier 10. A plurality of column signal lines RL1 to RLM are each arranged correspondingly to each of columns of the plurality of pixels P11 to PNM. Each of the plurality of column read out circuits RC1 to RCM reads out signals from pixels in the same column out of the pixels P11 to PNM through the column signal lines RL1 to RLM and saves the signals therein. The row scanning circuit 2 selects the signals of the plurality of pixels P11 to PNM row by row, and outputs the selected signals to each of the plurality of column signal lines RL1 to RLM. The row scanning circuit 2 receives a driving signal input from the imaging control unit 7, and firstly outputs a reset control signal res1 of the head row, a selection control signal sel1 thereof and a transfer control signal tx1 thereof. The pixels P11 to P1M in the first row output the pixel signals in the pixels to the column signal lines RL1 to RLM according to the transfer control signal tx1. The column scanning circuit 4 sequentially transfers the signals in each column, which are held by the plurality of the column read out circuits RC1 to RC4, to the output amplifier 10 through output lines LN and LS. The output amplifier 10 generates an image signal based on the transferred signal, and outputs the generated image signal. After having ended the control signals in the first row, the row scanning circuit 2 shifts the operation to the control for the second row. The row scanning circuit 2 outputs a reset control signal rest of the second row, a selection control signal sel1 thereof and a transfer control signal tx2 thereof. Pixels P21 to P2M in the second row output the pixel signals sent from the pixels, to the column signal lines RL1 to RLM according to the transfer control signal tx2. The pixel signals of the column signal lines RL1 to RLM are output to the output amplifier 10, in a similar way to that in the above description. The row scanning circuit 2 performs the similar processing to that in the above description, also for the second and later rows. After having performed the controls from the first row to the Nth row, the row scanning circuit 2 receives a trigger signal for starting the control in the first row again, which the imaging control unit 7 has generated, and repeats the above described control.

Figure 5:
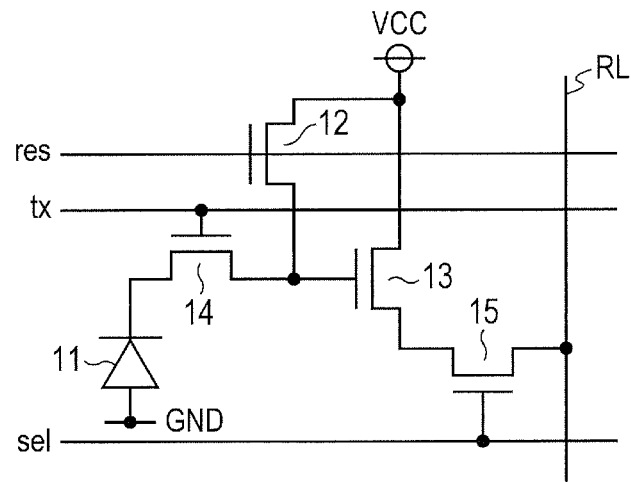
FIG. 5 is a view illustrating one example of a configuration of a pixel circuit according to the embodiment of the present invention.

Next, a configuration example of a circuit of pixels P11 to PNM will be described below with reference to FIG. 5. A photoelectric converting portion 11 performs a charge accumulation operation of generating an electric charge (signal) according to light and accumulating the generated electric charge. The photoelectric converting portion 11 is an element such as a photodiode. A transistor 12 receives a reset control signal res (res1 to resN) input into its gate, and resets a voltage of the gate of a transistor 13, in other words, floating diffusion (hereafter referred to as FD), to a power source voltage VCC. A transistor 14 receives a transfer control signal tx (tx1 to txN) input into its gate, and transfers an electric charge of the photoelectric converting portion 11 to the FD. The FD holds the electric charge as voltage. The transistor 13 of an output portion outputs the electric signal according to the voltage of the FD. A transistor 15 receives the selection control signal sel (sel1 to selN) input into its gate, and outputs the output signal of the transistor 13 to the column signal line RL. The column signal line RL corresponds to the column signal lines RL1 to RLM in FIG. 2.

Figure 6:
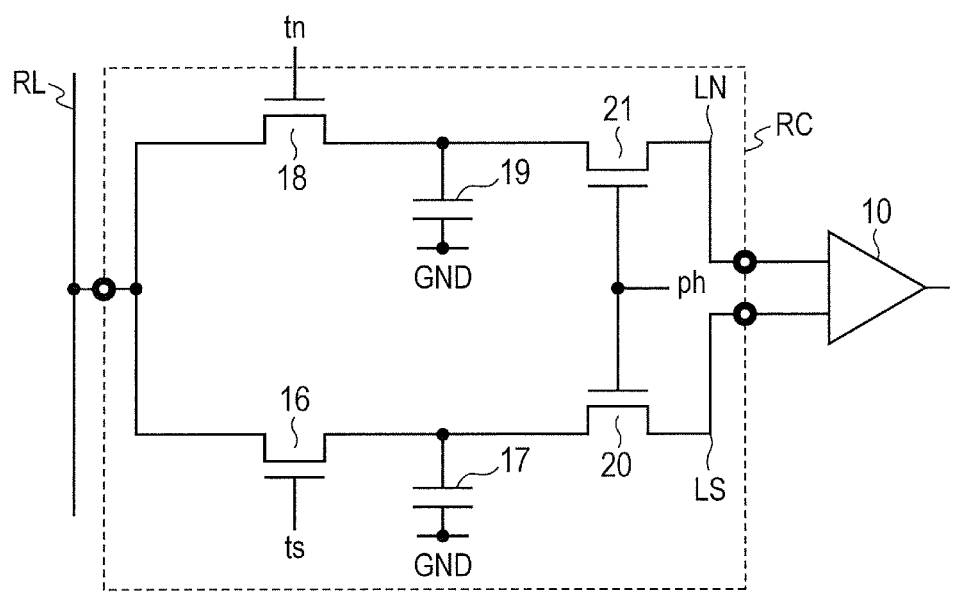
FIG. 6 is a view illustrating one example of a configuration of a read out circuit according to the embodiment of the present invention.

Next, a circuit configuration example of the column read out circuits RC1 to RCM will be described below with reference to FIG. 6. A column read out circuit RC in FIG. 6 corresponds to the column read out circuits RC1 to RCM in FIG. 2. An S-signal transfer switch 16 is turned on when an active control signal ts is supplied from the imaging control unit 7, and thereby transfers an S signal which has been read out from any one of the pixels P11, P21, P31 and PN1 in the first column when the pixel is not reset, to a holding capacitor 17. An N-signal transfer switch 18 is turned on when an active control signal tn is supplied from the imaging control unit 7, and thereby transfers an N signal which has been read out from any one of the pixels P11, P21, P31 and PN1 if the column is the first column when the pixel is reset, to a holding capacitor 19. The S-signal holding capacitor 17 continues holding the transferred S signal even after the transistor 16 has been turned off. In addition, in a similar way, the N-signal holding capacitor 19 continues holding the transferred N signal even after the transistor 18 has been turned off. When a column scanning signal ph is supplied from the column scanning circuit 4, transistors 20 and 21 which are column transfer switches are turned on. Thereby, the S signal held in the S-signal holding capacitor 17 is transferred to the output line LS, and the N signal held in the N-signal holding capacitor 19 is transferred to the output line LN. The output amplifier 10 performs CDS (Correlated Double Sampling: correlated double sampling) processing which takes a difference between the S signal transmitted by the output line LS and the N signal transmitted by the output line LN, and thereby generates an image signal and outputs the generated image signal.

Next, the content of an operation in FIG. 2 will be described in detail below with reference to a timing chart. As for the operation, a usual reading out operation of outputting pixel signals of the pixels P11 to PNM to the output amplifier 10 and a reset mode of shifting the operation to the next row after having performed only a reset operation for the pixels P11 to PNM in the above row will be described below.

Figure 3:
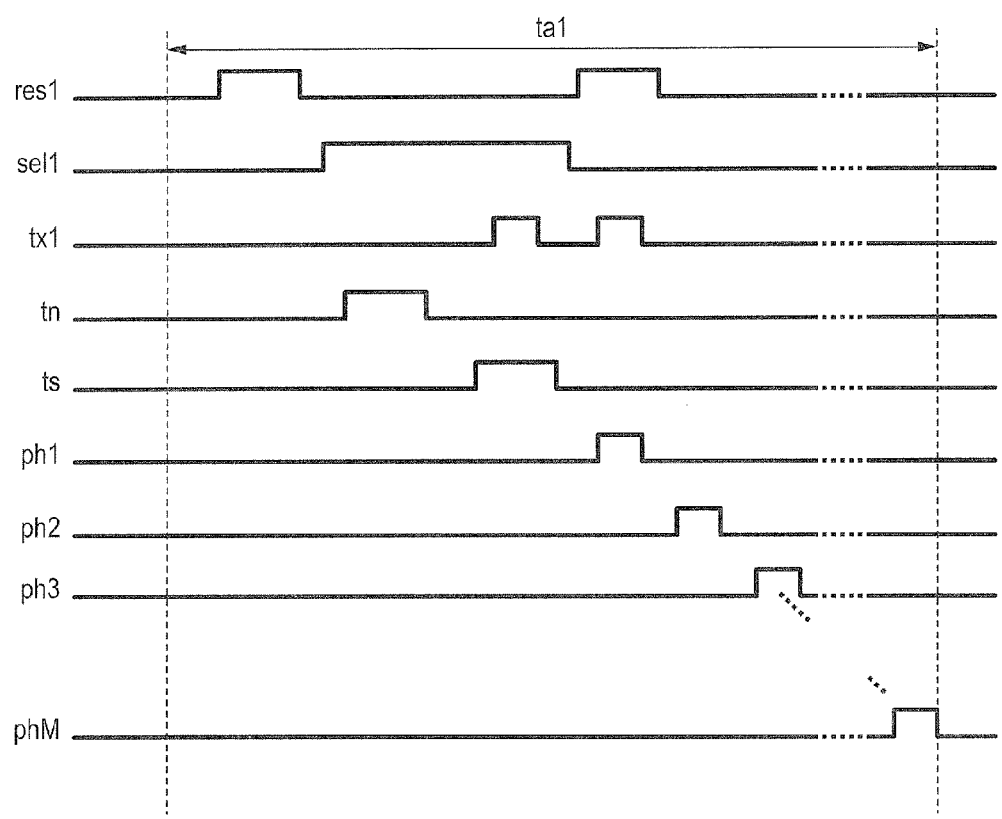
FIG. 3 is a view for describing a read out timing according to the embodiment of the present invention.

FIG. 3 is a timing chart illustrating the usual reading out operation. In FIG. 3, the reset control signal res1, the selection control signal sel1 and the transfer control signal tx1 represent the control signals for the pixels in the first row, but the control signals are similar to those in other rows as well. Firstly, the reset signal res1 is shifted from a low level to a high level and the transistor 12 is turned on. Thereby a potential of the FD is reset to the power source voltage VCC. After that, the reset signal res1 is shifted to the state of the low level again. Then, the selection control signal sel1 is shifted to the state of a high level, and the transistor 15 is turned on. Next, in the period of time while the control signal tn is in the high level, the transistor 18 is turned on, and the reset potential of the FD is held in the holding capacitor 19 of the read out circuit 3 through the column signal line RL, as an N signal. Next, the control signal tn is shifted to the low level, then the control signal ts is shifted to a high level, and the transistor 16 is turned on. In the period of time while the transfer control signal tx1 is in the high level, the transistor 14 is turned on, and the electric charge accumulated in the photoelectric converting portion 11 is transferred to the FD through the transistor 14 and is converted to the voltage there. The voltage of the FD is transmitted to the holding capacitor 17 through the transistors 13 and 15 and the column signal line RL, and is held as the S signal there. After that, the transfer control signal tx1, the control signal ts and the selection control signal sel1 are shifted to the low levels in this order, and the data transfer in the first row ends. After that, the reset control signal res1 is shifted to the high level again, and the transistor 12 is turned on. When the transfer control signal tx1 becomes a high level, the transistor 14 is turned on, and the electrode of the photoelectric converting portion 11 and the FD are reset to the power source voltage VCC again. At the same time when the data transfer in the first row ends, the column scanning circuit 4 outputs the column scanning signals ph1, ph2, ph3, - - - and phM, in this order, and the respective holding capacitors output the S signal and the N signal to the output lines LS and LN, sequentially from the first column to the mth column. A period of time between the start time of the transfer operation and the output time of the image signal to be spent for the first row requires a time period ta1.

Figure 4:
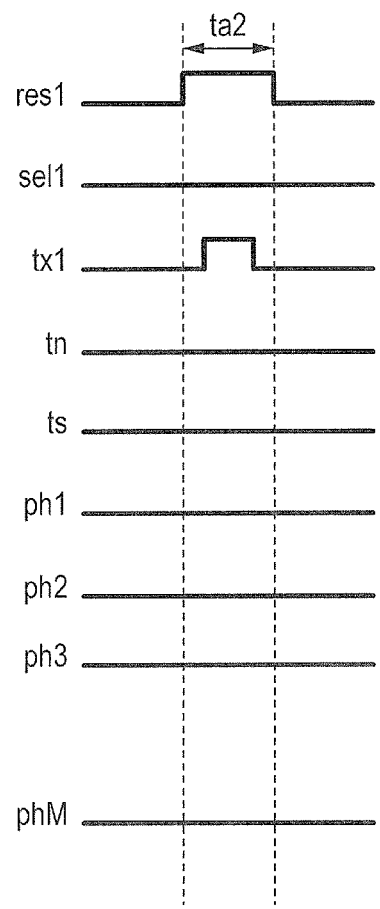
FIG. 4 is a view for describing a first reset timing according to the embodiment of the present invention.

FIG. 4 is a timing chart illustrating a reset operation of the photoelectric converting portion. In FIG. 4, the reset control signal res1, the selection control signal sel1 and the transfer control signal tx1 represent control signals for the pixels in the first row, but the control signals are similar to those also in other rows. In a reset operation, the reset control signal res1 becomes the state of a high level, the transfer control signal tx1 becomes the state of a high level, the transistors 12 and 14 are turned on, and the electrode of the photoelectric converting portion 11 and the FD are reset to the power source voltage VCC. Other control signals are kept in the states of low levels. The reading out operation is not performed, and the operation is shifted to the next row. A reset time period to be spent for the one row requires a time period ta2. A relationship between the time period ta1 of the reading out operation and the time period ta2 of the reset operation is usually ta2<ta1.

Figure 7:
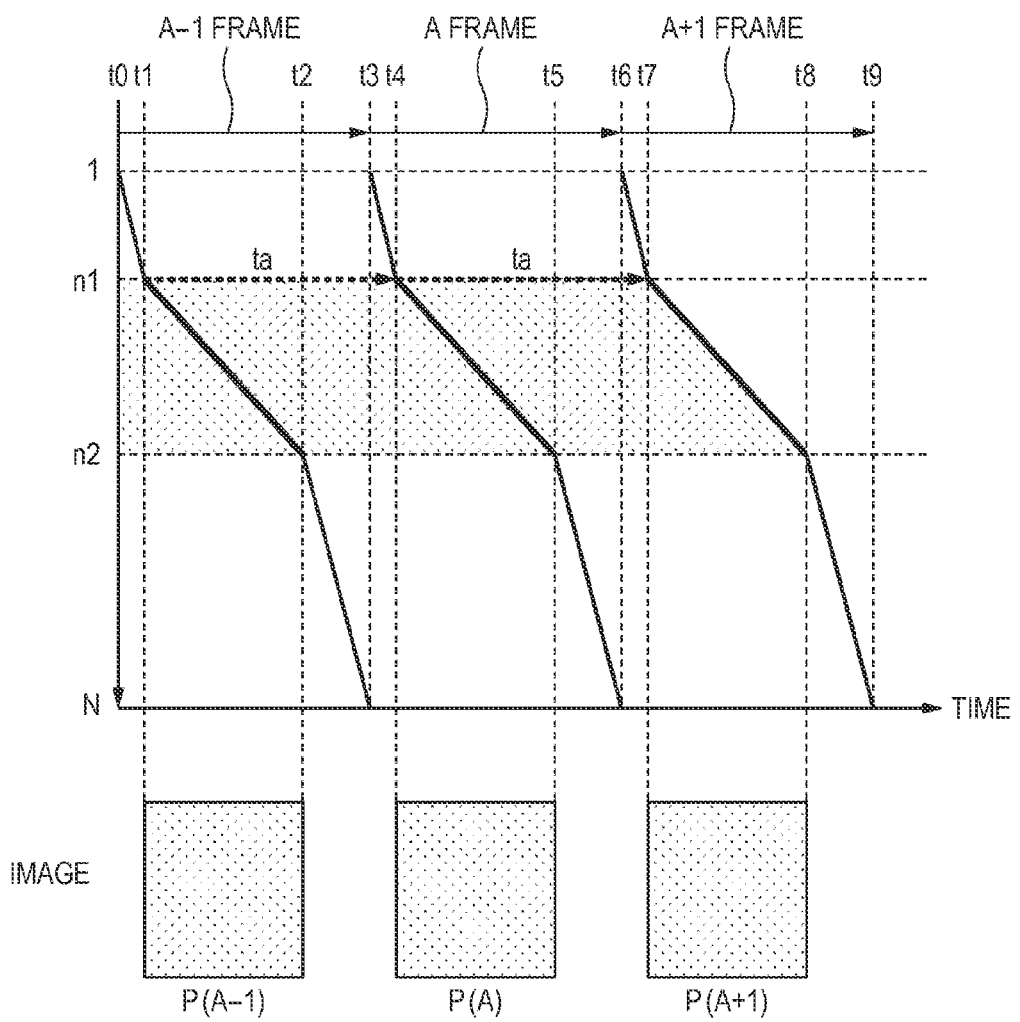
FIG. 7 is a view illustrating timings of a reading out operation and a reset operation for a read out region.

Next, a relationship of a charge accumulation period to be spent for an operation of a read out region will be described below with reference to a timing chart of FIG. 7. In a frame A−1, at the time t0, the imaging control unit 7 outputs a signal of starting an operation to the row scanning circuit 2, and the operation is started from the first row. During the time t0 to the time t1, the reading out operation from the first row to the n1th row is not performed, but only the reset operation is performed. During the time t1 to the time t2, a usual reading out operation is performed from the n1th row to the n2th row. During the time t2 to the time t3, only the reset operation is performed again from the n2th row to the Nth row. In a frame A and a frame A+1, the rows from the n1th row to the n2th row are read out, which are the same as those in the frame A−1. In other words, relationships of t1−t0=t4−t3=t7−t6, t2−t1=t5−t4=t8−t7 and t3−t2=t6−t5=t9−t8 hold. The charge accumulation period ta between the n1th row and the n2th row in the frame A is expressed by the following expression.

$$ta = ta1 \times (n2-n1) + ta2 \times (N-(n2-n1))$$

The image is constant in the frame A−1, the frame A and the frame A+1, and accordingly images P(A−1), P(A) and P(A+1) having the same charge accumulation period are output.

Figure 8A:
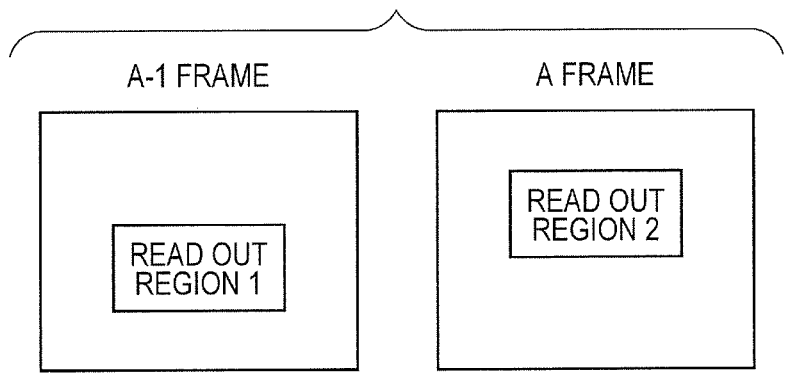
FIGS. 8A, 8B and 8C are views schematically illustrating states in which the read out region changes between frames.
Figure 8B:
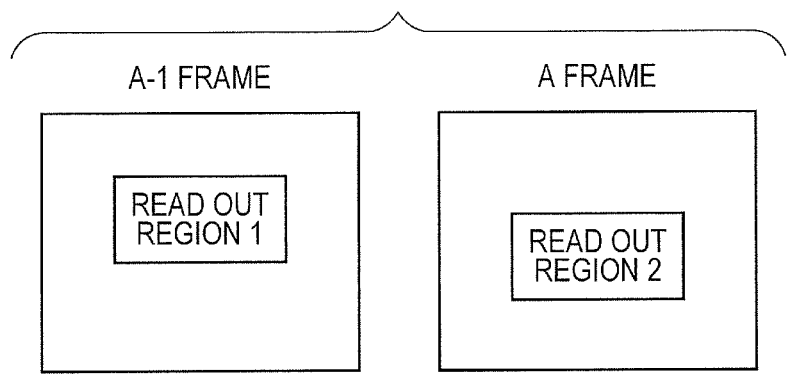
Figure 8C:
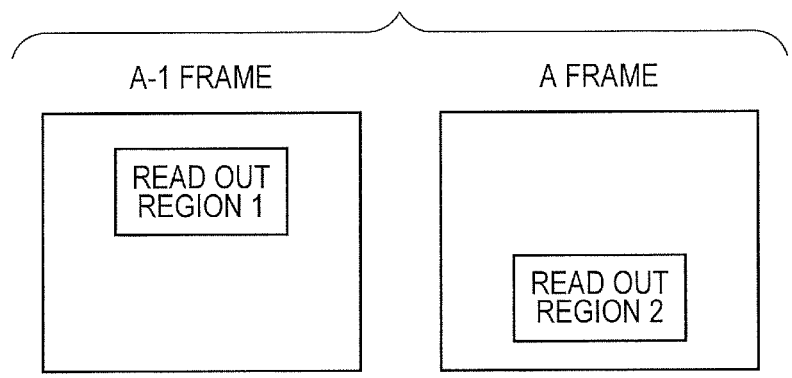

Next, the change of a charge accumulation period when the position of the read out region has changed will be described below. FIGS. 8A to 8C simply illustrate a plurality of assumed cases where the read out region changes.

The case 1 in FIG. 8A is the case where the read out region moves to the upper part of the screen when the frame has changed from the frame A−1 to the frame A, and the present frame partially overlaps with the previous frame. The case 2 in FIG. 8B is the case where the read out region moves to the lower part of the screen when the frame has changed from the frame A−1 to the frame A, and the present frame partially overlaps with the previous frame. The case 3 in FIG. 8C is the case where the read out region moves to the lower part of the screen when the frame has changed from the frame A−1 to the frame A, and the present frame does not overlap with the previous frame. The cases will be described below with reference to timing charts, respectively.

Figure 9:
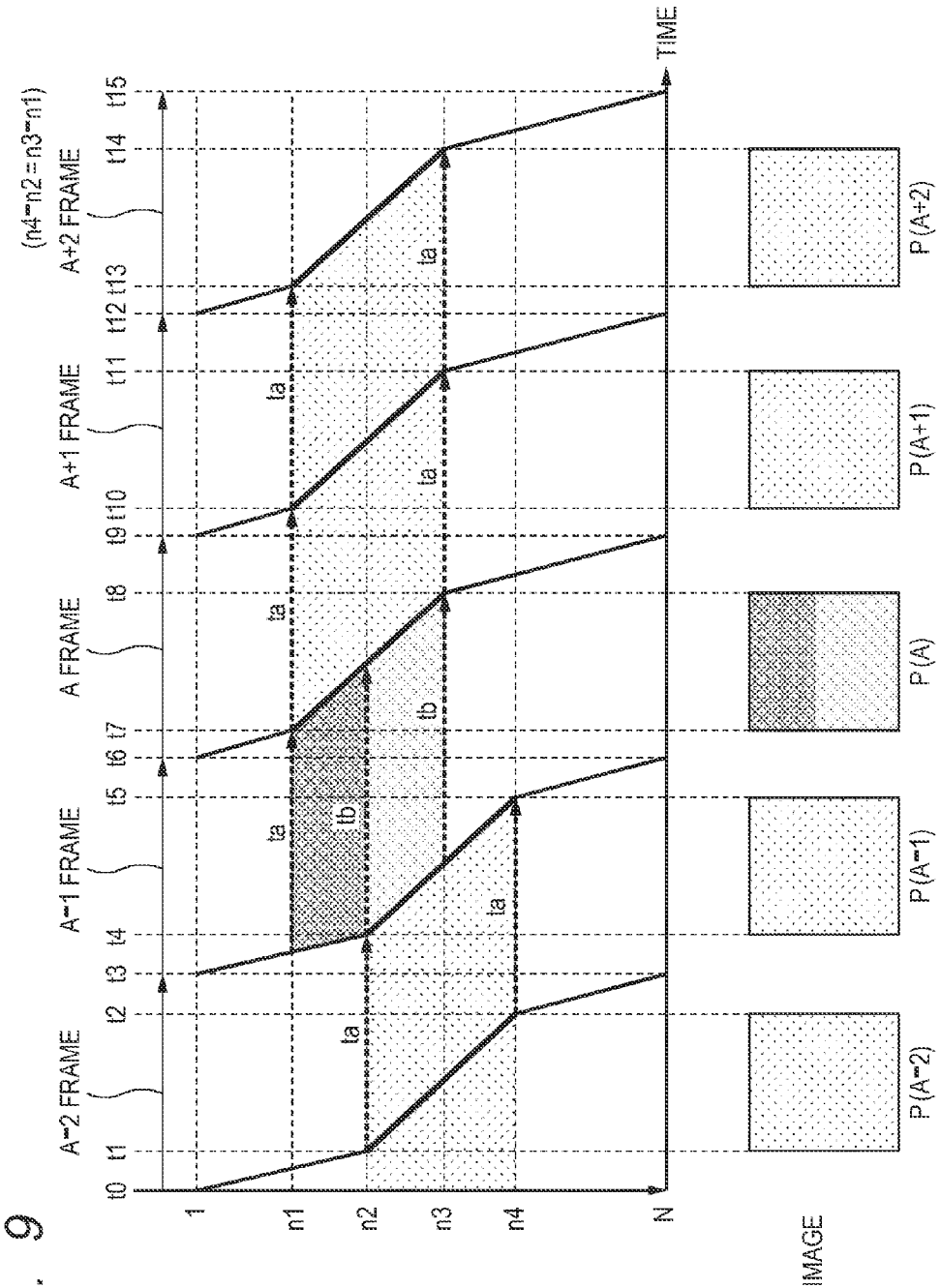
FIG. 9 is a view illustrating timing in changes of the read out region.

FIG. 9 illustrates a timing chart when the read out region moves to the upper part of the screen in the case 1 in FIG. 8A, and illustrates a driving method of a solid imaging apparatus. In the frame A−2, at the time to, the imaging control unit 7 outputs a signal of starting an operation to the row scanning circuit 2, and the operation is started from the first row. During the time t0 to the time t1, the reading out operation is not performed from the first row to the n2th row, but only the reset operation is performed. During the time t1 to the time t2, a usual reading out operation is performed from the n2th row to the n4th row. During the time t2 to the time t3, only the reset operation is performed again from the n4th row to the Nth row. In the frame A−1, the read out region is the same region as that in the frame A−2. In other words, relationships of t1−t0=t4−t3, t2−t1=t5−t4 and t3−t2=t6−t5 hold. The image is constant in the frame A−2 and the frame A−1, and accordingly images P(A−2) and P(A−1) having the same charge accumulation period are output.

Next, in the frame A, during the time t6 to the time t7, only the reset operation is performed from the first row to the n1th row. During the time t7 to the time t8, the reading out operation is performed from the n1th row to the n3th row. During the time t8 to the time t9, only the reset operation is performed again from the n3th row to the Nth row. In the frames A+1 and A+2, the read out rows are the n1th row to the n3th row, which are the same as those in the frame A. In other words, relationships of t7−t6=t10−t9=t13−t12, t8−t7=t11−t10=t14−t13 and t9−t8=t12−t11=t15−t14 hold. Even though the read out region changes, when the number of the read out rows is the same (n4−n2=n3−n1), the charge accumulation periods ta of the frames A−2, A−1, A+1 and A+2 are expressed in the following way.

$$ta = ta1 \times (n4 - n2) + ta2 \times (N - (n4 - n2))$$
$$= ta1 \times (n3 - n1) + ta2 \times (N - (n3 - n1))$$

In the frame A, the accumulation period ta in the n1th row and the charge accumulation period tb in the n2th to n3th rows are as follows.

$$ta = ta1 \times (n3 - n1) + ta2 \times (N - (n3 - n1)) \quad (1)$$
$$= ta1 \times (n3 - n1) + ta2 \times (N + n1 - n3)$$

$$tb = ta1 \times (n4 - n2) + ta2 \times (N - n4) + ta2 \times (n1) + ta1 \times (n2 - n1) \quad (2)$$
$$= ta1 \times (n4 - n1) + ta2 \times (N + n1 - n4)$$

Even though the read out region in the image changes, when the number of the read out rows is the same (n4−n2=n3−n1), the images having the same charge accumulation period ta are output as the images P(A−2), P(A−1), P(A+1) and P(A+2). The image P(A) in the frame A becomes an image which contains the shading of a luminance from the charge accumulation periods ta to tb, from the n1th row to the n2th row, and becomes an image having a constant luminance due to the charge accumulation period tb, from the n2th row to the n3th row. As for the charge accumulation periods ta and tb, relationships of n4>n3 and ta1>ta2 hold based on Expressions (1) and (2), and a relationship of tb>ta holds. Accordingly, the image P(A) becomes an image which contains the shading of the luminance and has a luminance higher than that of other images.

Figure 10:
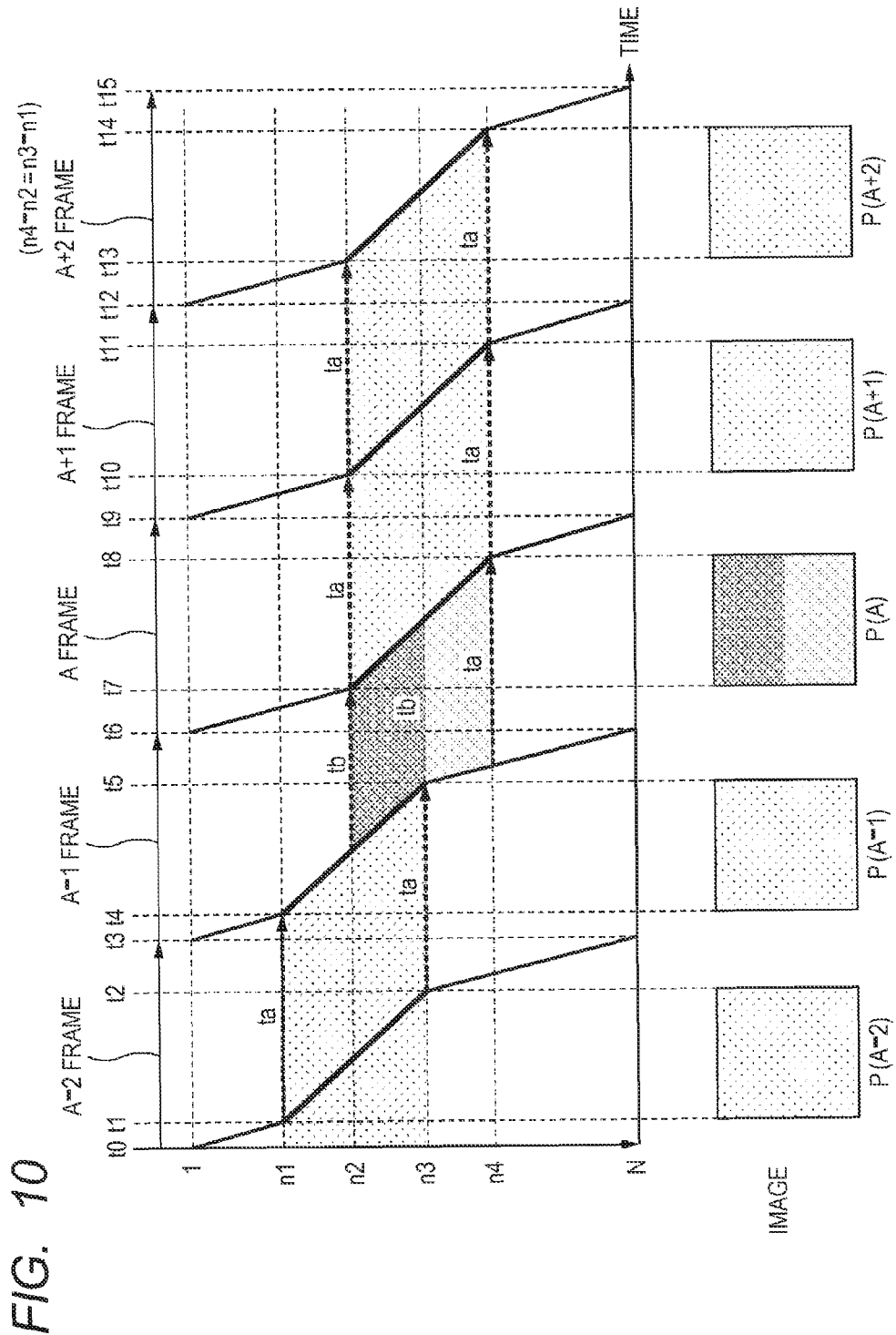
FIG. 10 is a view illustrating timing in changes of the read out region.

FIG. 10 illustrates a timing chart when the read out region moves to the lower part of the screen in the case 2 in FIG. 8B, and illustrates a driving method of a solid imaging apparatus. In the frame A−2, at the time to, the imaging control unit 7 outputs a signal of starting an operation to the row scanning circuit 2, and the operation is started from the first row. During the time t0 to the time t1, the reading out operation is not performed from the first row to the n1th row, but only the reset operation is performed. During the time t1 to the time t2, the usual reading out operation is performed from the n1th row to the n3th row. During the time t2 to the time t3, only the reset operation is performed again from the n3th row to the Nth row. In the frame A−1, the read out region is the same region as that in the frame A−2. In other words, relationships of t1−t0=t4−t3, t2−t1=t5−t4 and t3−t2=t6−t5 hold. The image is constant in the frame A−2 and the frame A−1, and accordingly the images P(A−2) and P(A−1) having the same charge accumulation period are output.

Next, in the frame A, during the time t6 to the time t7, only the reset operation is performed from the first row to the n2th row. During the time t7 to the time t8, the reading out operation is performed from the n2th row to the n4th row. During the time t8 to the time t9, only the reset operation is performed again from the n4th row to the Nth row. In the frame A+1 and frame A+2, the read out region is the same region as that in the frame A. In other words, relationships of t7−t6=t10−t9=t13−t12, t8-t7=t11−t10=t14−t13 and t9−t8=t12−t11=t15−t14 hold. Even though the read out region changes, when the number of the read out rows is the same (n3−n1=n4−n2), the charge accumulation periods ta of the frames A−2, A−1, A+1 and A+2 are expressed in the following way.

$$ta = ta1 \times (n3 - n1) + ta2 \times (N - (n3 - n1))$$
$$= ta1 \times (n4 - n2) + ta2 \times (N - (n4 - n2))$$

In the frame A, the charge accumulation period tb in the n2th to n3th rows and the charge accumulation period ta in the n4th row are as follows.

$$tb = ta1 \times (n3 - n2) + ta2 \times (N + n2 - n3) \quad (3)$$

$$ta = ta1 \times (n4 - n2) + ta2 \times (N - n4) + ta2 \times (n2) \quad (4)$$
$$= ta1 \times (n4 - n2) + ta2 \times (N + n2 - n4)$$

Even though the read out region in the image changes, when the number of the read out rows is the same (n4−n2=n3−n1), the images having the same charge accumulation period are output for the images P(A−2), P(A−1), P(A+1) and P(A+2). The image P(A) in the frame A becomes an image having the charge accumulation period tb and a constant luminance, from the n2th row to the n3th row. In addition, the image P(A) becomes an image which contains the shading of the luminance from the charge accumulation period tb to the charge accumulation period ta, from the n3th row to the n4th row. As for the charge accumulation periods ta and tb, relationships of n4>n3 and ta1>ta2 hold based on Expressions (3) and (4), and a relationship of tb<ta holds. Accordingly, the image P(A)

becomes an image which contains the shading of the luminance and has a luminance lower than that of other images.

Figure 11:
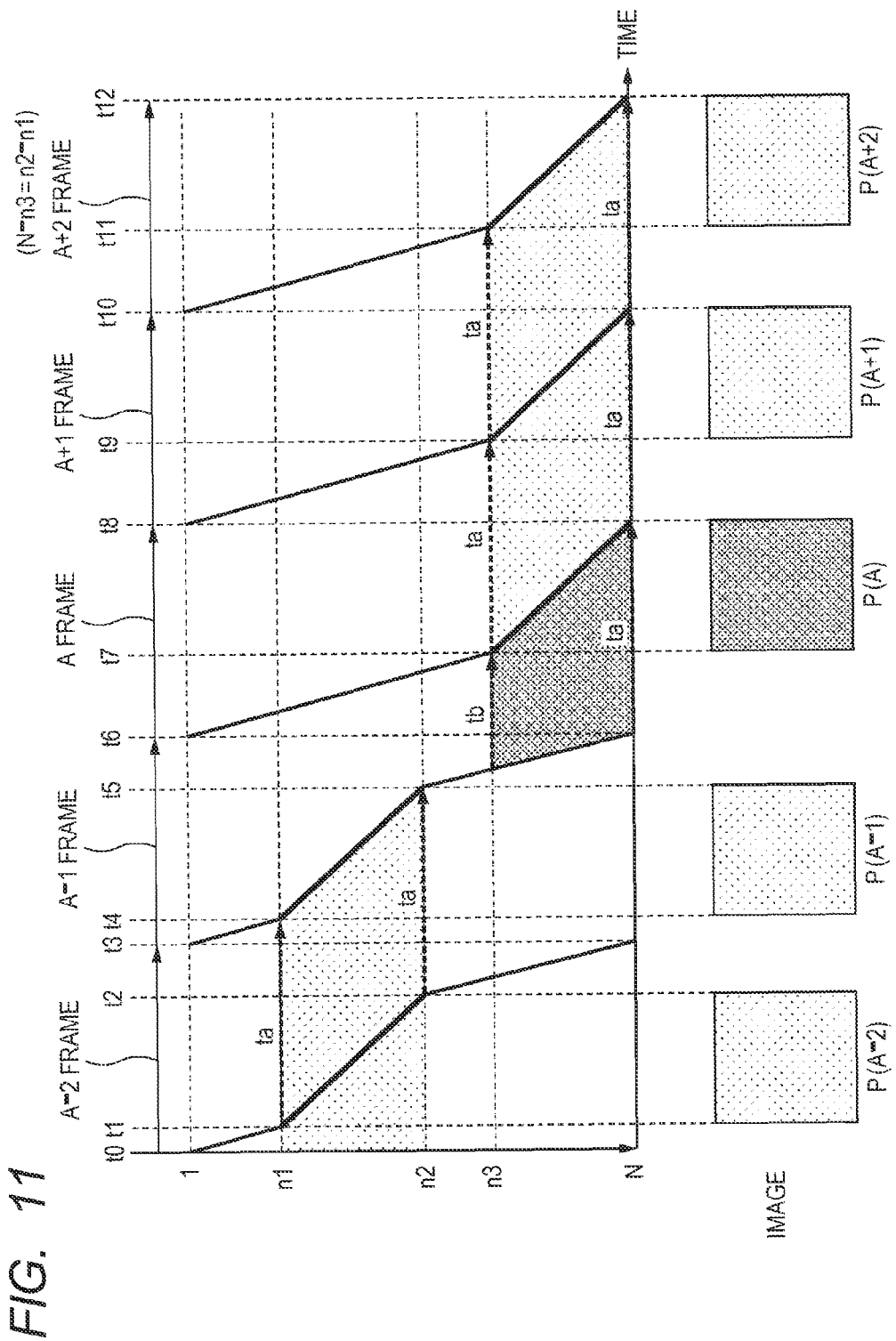
FIG. 11 is a view illustrating timing in changes of the read out region.

FIG. 11 illustrates a timing chart when the read out region moves to the lower part of the screen and the regions of the previous frame and the present frame do not overlap with each other, which has been described in the case 3 in FIG. 8C, and illustrates a driving method of a solid imaging apparatus. In the frame A−2, at the time t0, the imaging control unit 7 outputs a signal of starting an operation to the row scanning circuit 2, and the operation is started from the first row. During the time t0 to the time t1, the reading out operation is not performed from the first row to the n1th row, but only the reset operation is performed. During the time t1 to the time t2, a usual reading out operation is performed from the n1th row to the n2th row. During the time t2 to the time t3, only the reset operation is performed again from the n2th row to the Nth row. In the frame A−1, the read out region is the same region as that in the frame A−2. In other words, relationships of t1−t0=t4−t3, t2−t1=t5−t4 and t3−t2=t6−t5 hold. The image is constant in the frame A−2 and the frame A−1, and accordingly images P(A−2) and P(A−1) having the same charge accumulation period are output.

Next, in the frame A, during the time t6 to the time t7, only the reset operation is performed from the first row to the n3th row. During the time t7 to the time t8, the reading out operation is performed from the n3th row to the Nth row. In the frame A+1 and frame A+2, the read out region is the same region as that in the frame A. In other words, relationships of t7−t6=t9−t8=t11−t10 and t8−t7=t10−t9=t12−t11 hold. Even though the read out region changes, when the number of the read out rows is the same (n2−n1=N−n3), the charge accumulation periods ta of the frames A−2, A−1, A+1 and A+2 are expressed in the following way.

$$ta = ta1 \times (n2 - n1) + ta2 \times (N - n2 + n1)$$
$$= ta1 \times (N - n3) + ta2 \times (n3)$$

In the frame A, the charge accumulation period tb in the n3th row and the charge accumulation period ta in the n4th row are as follows.

$$tb = ta2 \times (N) \quad (5)$$

$$ta = ta1 \times (N-n3) + ta2 \times (N) \quad (6)$$

Even though the read out region in the image changes, when the number of the read out rows is the same (n2−n1=N−n3), the images having the same charge accumulation period are output for the images P(A−2), P(A−1), P(A+1) and P(A+2). The image P(A) in the frame A becomes an image which contains the shading of the luminance from the charge accumulation period tb in the n3th row to the charge accumulation period ta in the Nth row. As for the accumulation periods ta and tb, a relationship of tb<ta holds based on Expressions (5) and (6). Accordingly, the image P(A) becomes an image which has a luminance lower than that of other images.

In addition to the above description, there is also the case where the read out region moves to the upper part of the screen when the frame has changed from the frame A−1 to the frame A, and the present frame does not overlap with the previous frame, in contrast to the case 3. In this case, in contrast to the case 3, one frame becomes a shading image which is brighter than other frames, after the screen has moved.

In the case 1 to the case 3, the shading of the luminance and an absolute luminance due to a difference between the charge accumulation periods, which occur when the read out region changes, are improved by an operation of calculating the correction coefficient for the image.

In the case 1, in the shading of the luminance (from charge accumulation period ta to charge accumulation period tb) from the n1th row to the n2th row in the frame A, the accumulation period measuring unit 8 calculates a charge accumulation period tx in each row from the n1th row to the n2th row, as in the following expression. In addition, the accumulation period measuring unit 8 outputs the charge accumulation period tb from the n2th row to the n3th row.

$$tx = ta + (tb - ta)/(n2 - n1) \times (nx - n1) \quad (n1 \leq nx < n2)$$

$$tx = tb \quad (n2 \leq nx \leq n3)$$

The correction coefficient calculating unit 9 calculates a correction coefficient Zn based on the charge accumulation period tx of the measurement result of the accumulation period measuring unit 8, as in the following expression. Here, the tref represents a charge accumulation period of a reference.

$$Zn = tref/tx$$

When the charge accumulation period is the same in the frames before and after the read out region has changed (in the case 1, n4−n2=n3−n1), the deviation of the charge accumulation period, which occurs when the read out region has changed, is corrected by setting the charge accumulation period tref of the reference at ta. Thereby, an image free from a feeling of strangeness after the read out region has changed can be obtained. In addition, when the charge accumulation periods are different between frames before and after the read out region has changed (in the case 1, n4−n2≠n3−n1), it is acceptable to set the charge accumulation period tref of the reference to any one of the charge accumulation periods of the frames before and after the read out region has changed. In addition, in the case, it is also acceptable to set the charge accumulation period tref of the reference to a luminance corresponding to a charge accumulation period which is in the middle of the charge accumulation periods of the frames before and after the read out region has changed. Similarly in the case 2 and the case 3 as well, the accumulation period measuring unit 8 calculates the charge accumulation period in the row of the read out region, and the correction coefficient calculating unit 9 calculates a correction coefficient based on the calculated charge accumulation period.

The gain correcting circuits 6, 6a and 6b correct pixel signals, when the charge accumulation periods of the plurality of pixels P11 to PNM per each of rows are different from each other, by applying a gain to the pixel signals according to the charge accumulation periods per each of rows so as to reduce a difference of a signal value due to the difference between the charge accumulation period of the pixels in one row and the charge accumulation period of the pixels in the other row. The gain correcting circuit 6 and the like correct the pixel signals, when the pixel region selected for reading out in the present frame (frame A) is different from the pixel region selected for reading out in the previous frame (frame A−1), as are illustrated in FIGS. 8A to 8C, by applying a gain to the pixel signals so as to reduce a difference of a signal value due to the difference between the charge accumulation period of the pixels in one row and the charge accumulation period of the pixels in the other row.

Here, the scanning speed is different between the reset operation (t0 to t1 and the like) and the usual reading out operation (t1 to t2 and the like). In the usual reading out operation (t1 to t2 and the like), as is illustrated in FIG. 3, the row scanning circuit 2 subjects the pixels in a row within the pixel region selected for reading out to a processing for outputting the signals accumulated in the pixels to the plurality of column signal lines RL1 to RLM, and to a processing for resetting the signals in the pixels. In the reset operation (t0 to t1 and the like), as is illustrated in FIG. 4, the row scanning circuit 2 subjects the pixels in a row outside of the pixel region selected for reading out to the processing for resetting the signals in the pixels, without the processing for outputting the signals accumulated in the pixels.

(Second Embodiment)

Figure 12:
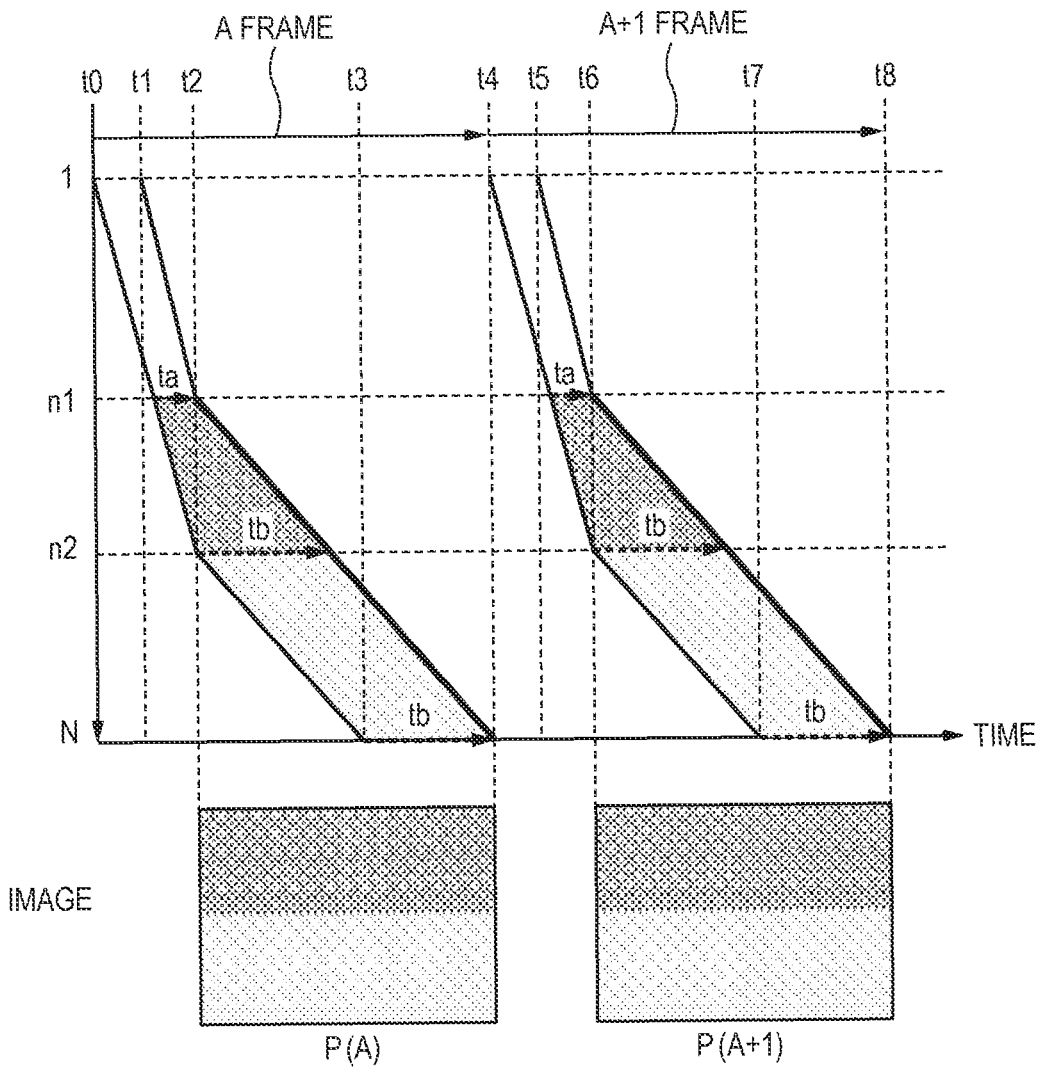
FIG. 12 is a view for describing timing according to the read out region.

FIG. 12 is a view illustrating timing according to the read out region in the second embodiment of the present invention. Points in which the second embodiment is different from the first embodiment will be described below. A first driving process starting from the time t0 and the time t4 performs only an operation in a reset mode of shifting the operation to the next row after having performed only a reset operation for the photoelectric converting portion 11. In addition, a second driving process starting from the time t1 and the time t5 performs an operation in the reset mode and the reading out operation. Here, one frame means a time period starting from the timing of a first driving pulse which starts from the time to, to the timing at which the timing of a second driving pulse which starts from the time t1 has reached the Nth row at the time t4.

Figure 13:
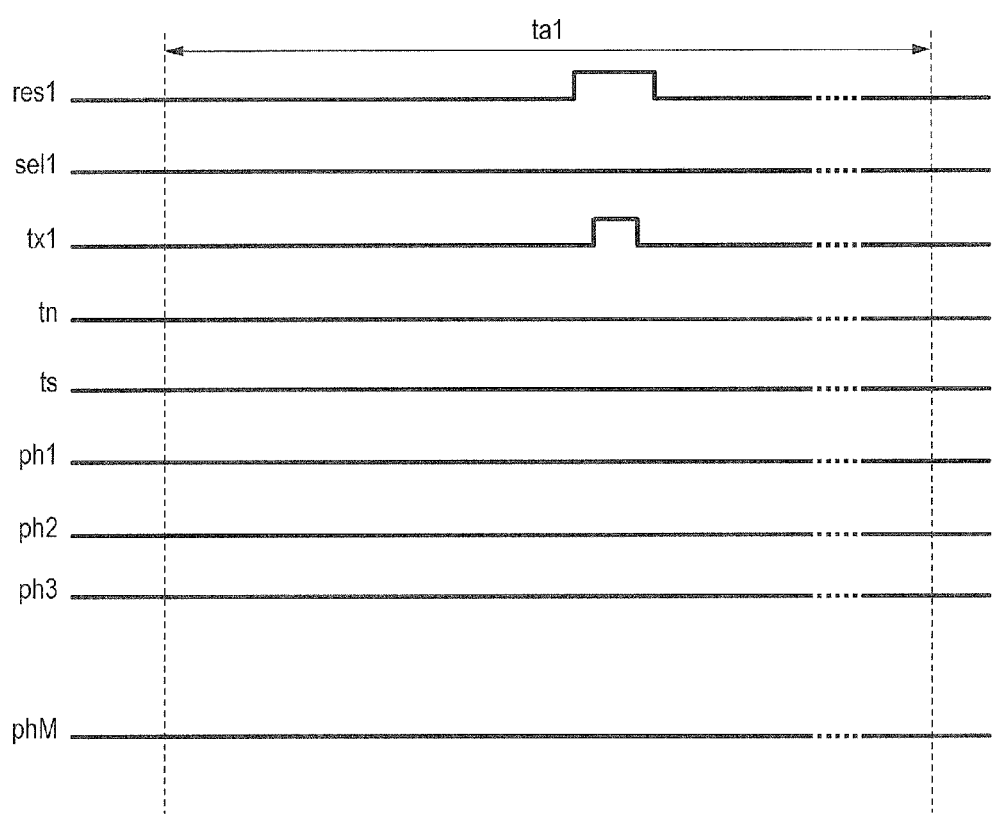
FIG. 13 is a view for describing second reset timing.

In the first driving process in the frame A, a driving pulse which is input into the first row at the time to performs a first reset operation until reaching the time t2, during the time period illustrated in FIG. 4. At the time t2 and afterward, a second reset operation illustrated in FIG. 13 is performed. The second reset operation illustrated in FIG. 13 has the same time period in which the pulses res1 and tx1 are in high levels, as that in the reset operation illustrated in FIG. 4, and an internal operation in each pulse is the same as the previous description. Accordingly, the description will be omitted. A time period necessary for the reset mode is the same time period ta1 as in the reading out operation illustrated in FIG. 3. A relationship between the time period ta2 of the first reset operation and the time period ta1 of the second reset operation is expressed by ta2<ta1.

Next, in the second driving process in the frame A in FIG. 12, a driving pulse which is input into the first row at the time t1 performs a first reset operation in the time period illustrated in FIG. 4 up to the time t2. Next, at the time t2 and afterward, a reading out operation illustrated in FIG. 3 is performed until reaching the time t4. The reading out operation is the same as that in the previous description, and accordingly the description will be omitted.

Figure 14:
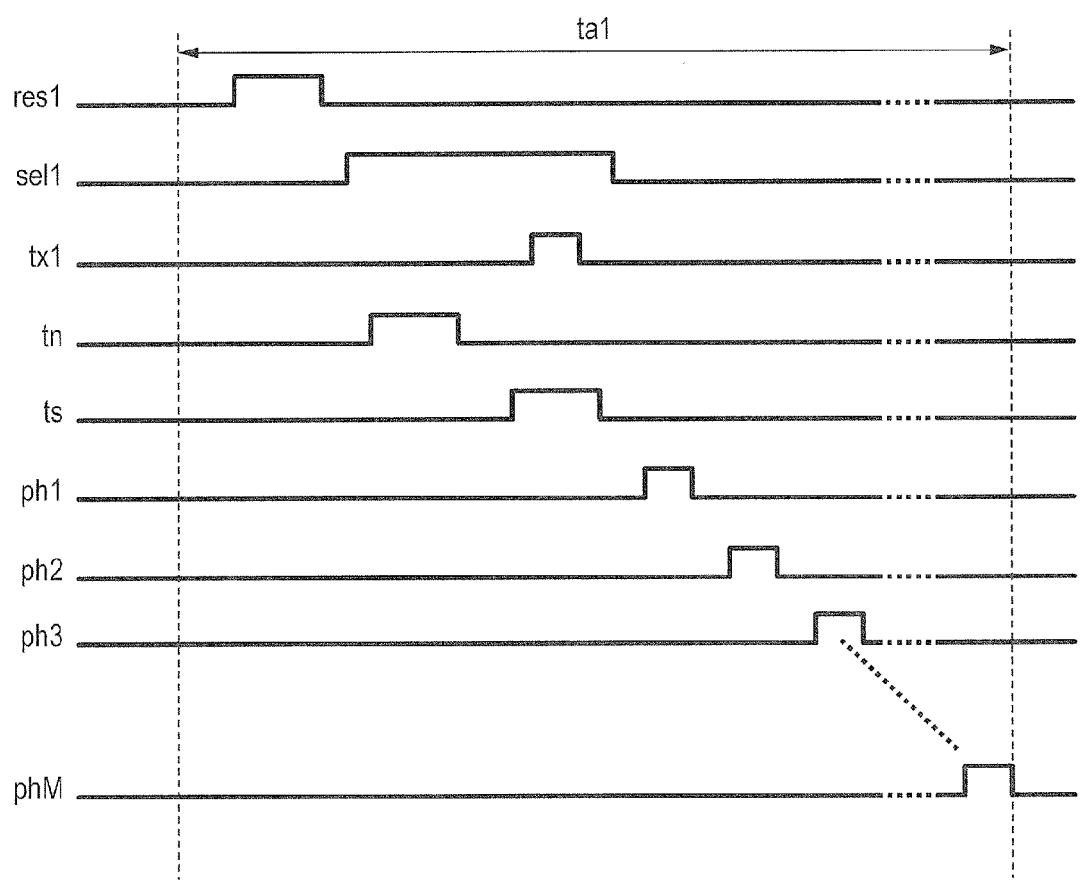
FIG. 14 is a view for describing read out timing.

In addition, furthermore, the reading out operation illustrated in FIG. 14 may be performed as the reading out operation. A point in which the reading out operation in FIG. 14 is different from the reading out operation in FIG. 3 is a point in which the reset control signal res1 and the transfer control signal tx1 do not become high levels again, after the selection control signal sel1 has become a low level. The photoelectric converting portions 11 are not reset, and are subjected only to the reading out operation. As for a relationship of the charge accumulation period to be spent for the operation of the read out region, a region for which the reading out operation is performed and from which the image is output is a region from the n1th row to the Nth row in the reading out period of time from the time t2 to the time t4.

The charge accumulation period to in the n1th row is as follows.

$$ta = ta2 \times (n2-n1)$$

In addition, the charge accumulation period tb in the n2th row to the Nth row is as follows.

$$tb = ta1 \times (n2-n1)$$

The image in the frame A becomes an image that contains the shading in which the luminance gets brighter from the charge accumulation period ta to the charge accumulation period tb, from the n1th row to the n2th row, as is illustrated in the image P(A) in FIG. 12. The image from the n2th row to the Nth row becomes a uniform image while the charge accumulation period is kept in the state of tb. In the frame A+1 as well, driving conditions of the operations in the time periods up to the times t5, t6, t7 and t8 after the time t4 are similar to those in the frame A. The image P(A+1) of the frame A+1 becomes similar to the image P(A) of the frame A, and becomes an image which contains the shading.

The shading of the luminance and an absolute luminance due to a difference between the charge accumulation periods, which occur in the second embodiment, are improved by an operation of calculating the correction coefficient for the image. In the shading of the luminance (from charge accumulation period ta to charge accumulation period tb) from the n1th row to the n2th row in the frame A (similarly in frame A+1), the accumulation period measuring unit 8 calculates a charge accumulation period tx in each row in the n1th row to the n2th row, as in the following expression. In addition, the accumulation period measuring unit 8 outputs the charge accumulation period tb from the n2th row to the n3th row.

$$tx = ta + (tb-ta)/(n2-n1) \times (nx-n1)(n1 \le nx < n2)$$

$$tx = tb(n2 \le nx \le n3)$$

The correction coefficient calculating unit 9 calculates a correction coefficient Zn based on the charge accumulation period tx of the measurement result of the accumulation period measuring unit 8, as in the following expression. Here, the tref represents a charge accumulation period of a reference.

$$Zn = tref/tx$$

The charge accumulation period tref of the reference may be set at the charge accumulation periods ta, tb or a desired value. The accumulation period measuring unit 8 calculates the charge accumulation period in the row of the read out region, and the correction coefficient calculating unit 9 calculates a correction coefficient based on the calculated charge accumulation period. The subsequent correction operation is similar to the operation in the previous description of the gain correcting circuit 6, and accordingly the description will be omitted.

In the present embodiment, the first gain correcting circuit 6a corrects pixel signals, when there exist a region in which the charge accumulation periods are different from each other in the n1th row to the n2th row, and a region in which the charge accumulation periods are the same in the n2th row to the Nth row, in one frame, by applying a gain to the pixel signals so as to reduce a difference of a signal value due to the difference between the charge accumulation period of the pixels in one row and the charge accumulation period of the pixels in the other row. A first driving process is a driving process of subjecting the pixels in a row outside of the pixel region selected for reading out to the processing for resetting the signals in the pixels, without the processing for outputting the signals accumulated in the pixels. A second driving process is a driving process of subjecting the pixels in a row within the pixel region selected for reading out to a processing for outputting the signals accumulated in the pixels to the column signal lines RL1 to RLM, at least row by row.

Incidentally, the present embodiment is particularly useful when the row scanning circuit 2 is a circuit of performing the first driving process and the second driving process in the same frequency. This is because in the case of this row scanning circuit 2, gradients of the driving pulse in the first driving process and the driving pulse in the second driving process in a period of time from the time t1 to the time t2 in FIG. 12 become equal to each other, and gradients of the driving pulse in the first driving process and the driving pulse in the second driving process in a period of time from the time t2 to the time t3 become equal to each other.

(Third Embodiment)

Figure 15:
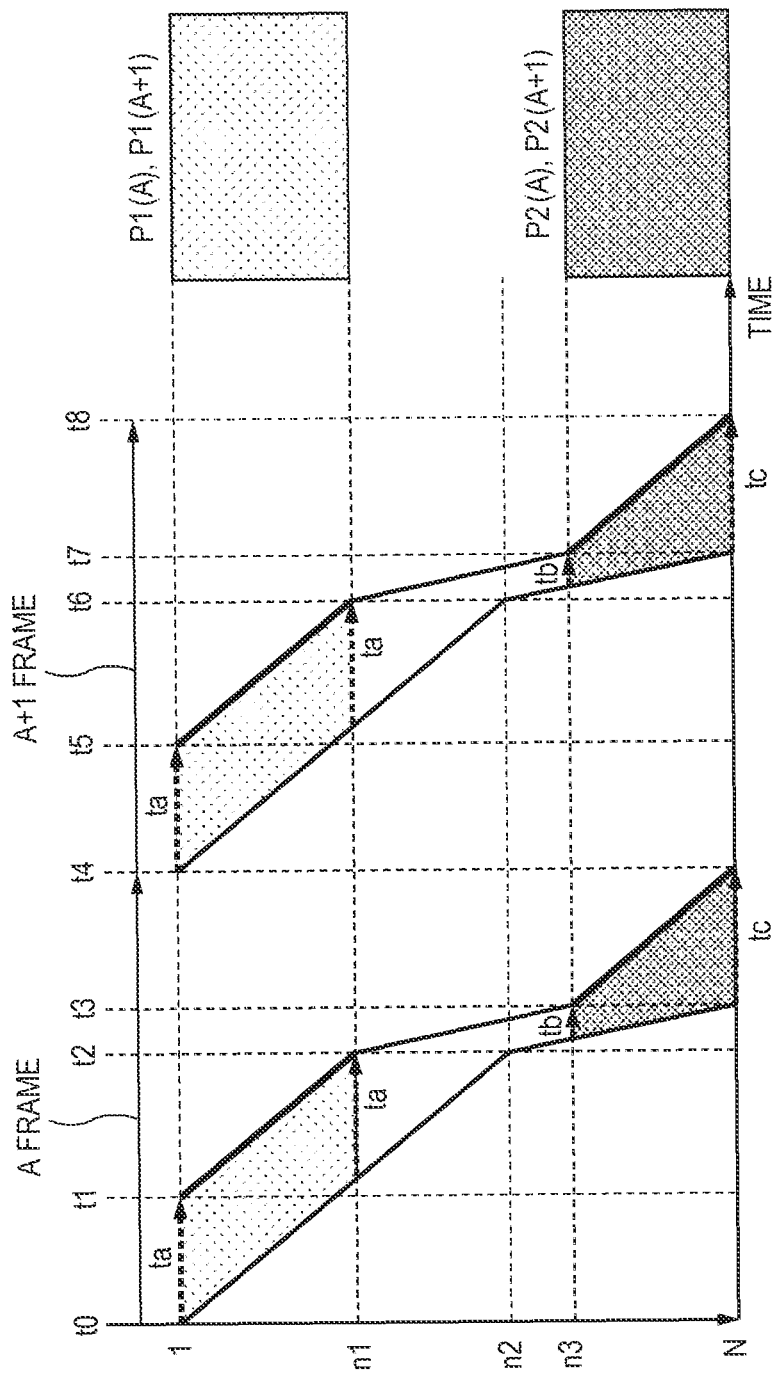

FIG. 15 is a view illustrating timing according to the read out region in the third embodiment of the present invention. The present embodiment is different from the second embodiment in a point that a plurality of additional screens is subjected to the select operation. A first driving pulse starting from the time t0 and the time t4 performs only an operation in the reset mode of shifting the operation to the next row after having performed only a reset operation for the photoelectric converting portion 11. In addition, a second driving pulse starting from the time t1 and the time t5 performs the operation in the reset mode and the reading out operation. Here, one frame means a time period starting from the timing of a first driving pulse which starts from the time to, to the timing at which the timing of a second driving pulse which starts from the time t1 has reached the Nth row at the time t4.

In the first driving process in the frame A, the driving pulse which is input into the first row at the time to performs a second reset operation until reaching the time t2, during the time period illustrated in FIG. 13. At the time t2 and afterward, a first reset operation illustrated in FIG. 4 is performed. The second reset operation illustrated in FIG. 13 has the same time period in which the pulses res1 and tx1 are in high levels, as that in the reset operation illustrated in FIG. 4, and an internal operation in each pulse is the same as the previous description. Accordingly, the description will be omitted. A time period necessary for the reset mode is the same time period ta1 as in the reading out operation illustrated in FIG. 3. A relationship between the time period ta2 of the first reset operation and the time period ta1 of the second reset operation is expressed by ta2<ta1.

Next, in the second driving process in the frame A, the driving pulse which is input into the first row at the time t1 performs the reading out operation until reaching the time t2, during the time period illustrated in FIG. 3. Next, a reading out operation illustrated in FIG. 4 is performed from the time t2 until reaching the time t3. Furthermore, a reading out operation is performed from the time t3 until reaching the time t4. The reading out operation is the same as that in the previous description, and accordingly the description will be omitted. As for the reading out operation, it is acceptable to perform the reading out operation without performing the reset operation of the photoelectric converting portion 11, which is illustrated in FIG. 14. As for a relationship of the charge accumulation period to be spent for the operation of the read out region, a region for which the reading out operation is performed and from which the image is output is a region from the first row to the n1th row in the reading out period of time from the time t1 to the time t2, and a region from the n3th row to the Nth row in the reading out period of time from the time t3 to the time t4.

The charge accumulation period ta in the first row and the n1th row is as follows.

$$ta = ta1 \times (n2-n1)$$

In addition, the charge accumulation period tb in the n3th row is as follows.

$$tb = ta2 \times (N-n3)$$

In addition, the charge accumulation period tc in the Nth row is as follows.

$$tc = ta1 \times (N-n3)$$

The image in the frame A becomes a uniform image in which the charge accumulation period ta is a constant time period from the first row to the n1th row, as is illustrated in the image P1(A) in FIG. 15. In addition, the image in the frame A becomes an image that contains the shading in which the luminance gets brighter from the charge accumulation period tb to the charge accumulation period tc, from the n3th row to the Nth row, as is illustrated in the image P2(A). In the frame A+1 as well, driving conditions of the operations in the time periods up to the times t5, t6, t7 and t8 after the time t4 are similar to those in the frame A. The image P2(A+1) becomes an image which contains the shading, similarly to the image P2(A).

The shading of the luminance and an absolute luminance due to a difference between the charge accumulation periods, which occur in the third embodiment, are improved by an operation of calculating the correction coefficient for the image. The accumulation period measuring unit 8 calculates a charge accumulation period tx in each row in the frame A (similarly in frame A+1) according to the following expressions.

$$tx = ta (1 \leq nx < n1)$$

$$tx = tb + (tc-tb)/(N-n3) \times (nx-n3)(n3 \leq nx \leq N)$$

The correction coefficient calculating unit 9 calculates a correction coefficient Zn based on the charge accumulation period tx of the measurement result of the accumulation period measuring unit 8, as in the following expression. Here, the tref represents a charge accumulation period of a reference.

$$Zn = tref/tx$$

The charge accumulation period tref of the reference may be set at the charge accumulation periods ta, tb or a desired value. The accumulation period measuring unit 8 calculates the charge accumulation period in the row of the read out region, and the correction coefficient calculating unit 9 calculates a correction coefficient based on the calculated charge accumulation period. The subsequent correction operation is similar to the operation in the previous description of the gain correcting circuit 6, and accordingly the description will be omitted.

In the present embodiment, it is described how to correct the image in the case where the ratio of the number of driven rows for the reset operation to the number of driven rows for the usual reading out operation is equal and the timing of the usual reading out operation is different between the present frame and the previous frame, in other words, in the case where the read out region is changed. It is also described how to correct the image which occurs in a driving method of separating the reset operation from the usual reading out operation during 1 frame period of time, even though the read out region is not changed.

However, the present embodiment can be applied, for instance, also to the binning operation which performs the usual reading out operation and the reset operation alternately or performs the usual reading out operation every several rows. Specifically, the shading of luminance and the difference of absolute luminance occur also when the binning operation has been changed, due to a similar deviation of the charge accumulation period. Adequate images can be obtained for these cases, by performing the correction. In addition, the correction can be performed similarly also for the combination of the read out region and the binning operation.

Incidentally, the present embodiment is particularly useful when the row scanning circuit 2 is a circuit of performing the first driving process and the second driving process in the same frequency. This is because in the case of this row scanning circuit 2, gradients of the driving pulse in the first driving process and the driving pulse in the second driving process in a period of time from the time t0 to the time t2 in FIG. 15 become equal to each other, and gradients of the driving pulse in the first driving process and the driving pulse in the second driving process in a period of time from the time t2 to the time t3 become equal to each other.

In addition, in the case where the ratio of the number of driven rows for the reset operation to the number of driven rows for the usual reading out operation is different, it is unavoidable that the charge accumulation periods result in being different depending on the row in a plane. In this case as well, the correction can be similarly performed. Specifically, in-plane non-uniformity occurs because charge accumulation periods of pixels in each row are different due to a difference of a driving condition between frames, but is corrected by measuring the charge accumulation periods of the pixels in each row in the plane, calculating a correction coefficient, and correcting the signals of the read out circuit 3 by applying a gain to the signals based on the calculated correction coefficient. Thereby, even in the case where a driving method has been switched, the non-uniform part in the image due to a difference of the charge accumulation period can be prevented from occurring. In addition, a quality level of the output image can be maintained while a decrease of the frame rate is suppressed.

In addition, in the present embodiment, the measurement of the charge accumulation period and the correction of signals by a gain are performed during photographing which is almost simultaneous with the reading out of the pixel signals, but the imaging system is not limited to the above described system. If the driving condition is determined before photographing, for instance, it is acceptable to measure the charge accumulation period beforehand, store the result in a memory or the like, and when an actual signal is read out, correct the signal by applying a gain to the signal. In addition, it is also acceptable to measure the charge accumulation period in each row after photographing in which the read out circuit has finished reading out all read out signals, and correct the read out signals by applying a gain to the read out signals. It is clear that the present embodiment has an effect in any system.

Note that the above embodiments are merely examples how the present invention can be practiced, and the technical scope of the present invention should not be restrictedly interpreted by the embodiments. In other words, the present invention can be practiced in various ways without departing from the technical concept or main features of the invention.

The imaging apparatus in each embodiment can prevent the non-uniformity of the image due to the deviation of the charge accumulation period. In addition, the imaging apparatus can maintain the quality level of the output image while suppressing the decrease of the frame rate due to the correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-045705, filed Mar. 7, 2013, and Japanese Patent Application No. 2013-253479, filed Dec. 6, 2013, which are hereby incorporated by reference herein in their entirety.

What is claimed is:

1. An imaging apparatus comprising:
a plurality of pixels arranged in a matrix, each pixel accumulating an electric charge based on an incident light quantity;
a plurality of signal lines each arranged correspondingly to each of columns of the plurality of pixels;
a row scanning circuit configured to select the plurality of pixels row by row for outputting signals from the plurality of pixels to the plurality of signal lines; and
a first gain correcting circuit configured to correct the signals in the plurality of signal lines by applying a gain to the signals, wherein when rows of a pixel region selected for reading out in a present frame is different from rows of a pixel region selected for reading out in a previous frame so that a charge accumulation period of a first row of the plurality of pixels is different from a charge accumulation period of a second row of the plurality of pixels, the first gain correcting circuit corrects the signals to reduce a difference of a signal value due to the difference of the charge accumulation period between the first row and the second row.

2. The imaging apparatus according to claim 1, wherein the row scanning circuit performs a operation of reading out the signals accumulated in the plurality of pixels of the pixel region selected for reading out, and performs a operation of resetting the signals accumulated in the plurality of pixels of the pixel region selected for reading out, and
performs a operation of resetting the signals accumulated in the plurality of pixels outside of the pixel region for reading out, without performing a operation of reading out the signals accumulated in the plurality of pixels outside of the pixel region for reading out.

3. The imaging apparatus according to claim 1, wherein the row scanning circuit reads out signals accumulated in the plurality of pixels each of a first region and a second region,
the first region includes rows of the plurality of pixels, each row having a charge accumulation period being different from each other,
the second region includes rows of the plurality of pixels, each row having a charge accumulation period being same each other, and
the first gain correcting circuit corrects the signals output from the first region to reduce the difference of the signal value due to the difference in the charge accumulation period.

4. The imaging apparatus according to claim 1, wherein each of the plurality of pixels includes a photoelectric converting portion accumulating the electric charge based on the incident light quantity,
the row scanning circuit further performs a first driving to reset, row by row, the photoelectric converting portion of each of the plurality of pixels, and
the photoelectric converting portion of each of the plurality of pixels accumulates the electric charge after the first driving.

5. The imaging apparatus according to claim 3, wherein
the row scanning circuit performs, in the same frequency, a driving to reset row by row the signals of the pixels in the row outside of the pixel region selected for reading out, and a driving to output to the plurality of signal lines, row by row, the signals of the plurality of pixels in the row within the pixel region selected for reading out.

6. The imaging apparatus according to claim 4, wherein
the row scanning circuit performs a second driving to reset row by row the signals of the pixels in the row outside of the pixel region selected for reading, and a third driving to output to the plurality of signal lines, row by row, the signals of the pixels in the row within the pixel region selected for reading out, and
the row scanning circuit performs the second driving and the third driving in the same frequency.

7. The imaging apparatus according to claim 1, wherein
the first gain correcting circuit performs correcting the signals according to the charge accumulation period of each row of the plurality of pixels.

8. The imaging apparatus according to claim 1, further comprising an analog-to-digital converter configured to convert an analog signal in the plurality of signal lines to a digital signal, wherein
the first gain correcting circuit performs correcting the digital signal.

9. The imaging apparatus according to claim 1, wherein
the first gain correcting circuit performs correcting an analog signal in the plurality of signal lines.

10. The imaging apparatus according to claim 1, further comprising an analog-to-digital converter configured to convert the analog signal corrected by the first gain correcting circuit, to a digital signal; and
a second gain correcting circuit configured to correct the digital signal, wherein the second gain correcting circuit performs correcting the digital signal to reduce a difference of a signal value due to the difference of the charge accumulation period between the first row and the second row.

11. A driving method of an imaging apparatus, wherein the imaging apparatus comprises:

a plurality of pixels arranged in a matrix, each pixel generating and accumulating an electric charge based on an incident light quantity;

a plurality of signal lines each arranged correspondingly to each of columns of the plurality of pixels; and a row scanning circuit configured to select the plurality of pixels row by row for outputting signals from the plurality of pixels to the plurality of signal lines, wherein the method comprises:

a first gain correcting step for correcting the signals in the plurality of signal lines by applying a gain to the signals, and wherein when rows of a pixel region selected for reading out in a present frame is different from rows of a pixel region selected for reading out in a previous frame so that a charge accumulation period of a first row of the plurality of pixels is different from a charge accumulation period of a second row of the plurality of pixels, the first gain correcting step is performed to correct the signals to reduce a difference of a signal value due to the difference of the charge accumulation period between the first row and the second row.

* * * * *